June 10, 1947.　　　　P. J. OVREBO　　　　2,421,758
HIGH POWER RADIO-FREQUENCY AIR-CALORIMETER-WATTMETER
Filed Sept. 25, 1945

INVENTOR
PAUL J. OVREBO
BY
ATTORNEY

Patented June 10, 1947

2,421,758

UNITED STATES PATENT OFFICE.

2,421,758

HIGH-POWER RADIO-FREQUENCY AIR-CALORIMETER-WATTMETER

Paul J. Ovrebo, Dayton, Ohio

Application September 25, 1945, Serial No. 618,592

4 Claims. (Cl. 201—63)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio transmitters and particularly to an improved high power radio-frequency wattmeter for measuring the output thereof.

In measuring the output of high power radio transmitters difficulty has been encountered in providing a suitable dummy load which can be used continuously for an indefinite time to dissipate the transmitter output while the measurement is being made. Problems of properly matching the load impedance to the transmitter and obtaining accurate measurement of power have also arisen.

It is an object of this invention to facilitate the measurement of radio-frequency power by providing an airflow - calorimeter - wattmeter wherein a resistor in a hydrogen-filled container is arranged as the center conductor of a concentric line which is cooled by forced air flow.

Figure 1:
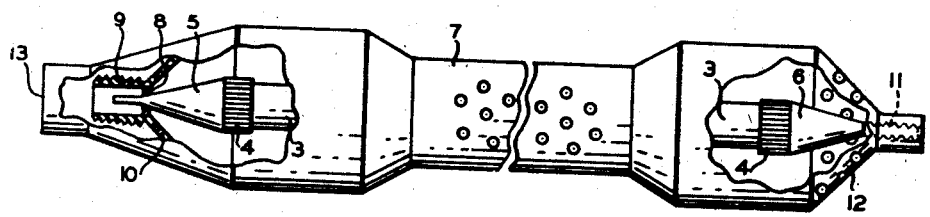
Figure 2:
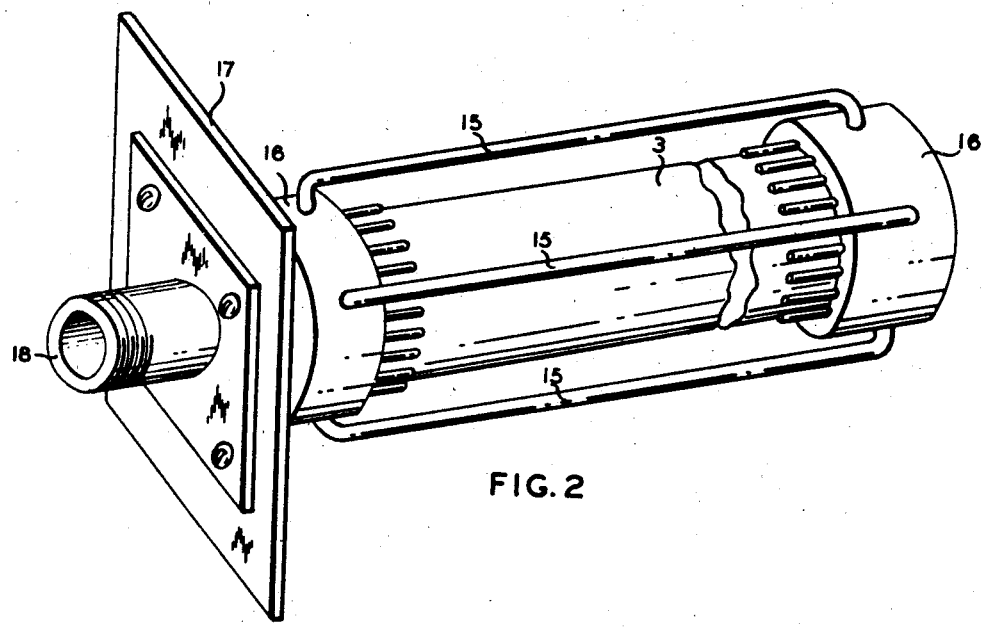

For a better understanding of the invention, together with other objects thereof, reference is had to the following detailed description taken in connection with the accompanying drawing in which:

Fig. 1 is an elevational view, partially broken away, of the dummy load structure in a calorimeter-wattmeter according to the present invention, and Fig. 2 is a perspective view of a modified form of the invention.

Referring to Fig. 1, the structure essentially comprises a coaxial line in which the center conductor is a resistor 3, preferably of the hydrogen-filled resistor container type for rapid dissipation of heat. The resistor 3 is supported at its ends by finger portions 4 of the tapered end pieces 5 and 6. The outer conductor is a cylindrical shell 7 of brass or other suitable metal which is constructed to afford a predetermined characteristic impedance of the line in conjunction with the inner conductor 3. The shell 7 may comprise several interfitting parts to facilitate disassembling as required. The stem of the member 5 extends through an insulating ring 8 into a coaxial cable fitting or connector 9 which terminates a tapered metallic member 10 that is embodied within and joined to the shell 7. The coaxial cable (not shown) is passed through the open end 13 of the shell 7 and is attached to the fitting 9. The end member 6 of the resistor 3 has a stem which is received in a socket 11 in the tapered end 12 of the shell 7, thereby effecting an electrical connection between the adjoining ends of the inner and outer conductors. The impedance of the line is designed so that the load is matched to the output circuit of the transmitter.

Preferably the shell 7 is perforated throughout its length and openings may also be afforded in the tapered ends 10 and 12 to enable the flow of air through the structure for cooling the resistors 3. In using the illustrated device as a calorimeter it is inclosed in a suitable container through which a regulated air blast is forced, electrical connection being made to the radio-frequency source of which the output is to be measured. The change in temperature of the air is indicative of the power output. This device has enabled radio-frequency power to be dissipated and measured up to 1000 watts at frequencies up to 60 megacycles, with present impedance characteristics of the load. With improvement of such characteristics, useful range may be increased in approximate proportion.

In Fig. 2 a modification is illustrated wherein the outer conductor of the coaxial line load is made up of a series of parallel, spaced rods or members 15 forming a cage around the resistor 3. This greatly facilitates cooling the resistor. The conductors 15 extend between and are secured to sockets 16 in which the ends of the resistor 3 are received. One of the sockets 16 is attached to a supporting plate or bracket 17 that is mounted on the chassis of the calorimeter apparatus. A suitable coaxial connector 18 is provided for the load as shown. The whole structure is rigid and capable of being supported at one end only.

While there have been disclosed several preferred embodiments of the invention, it will be understood that these can be modified by persons skilled in the art without departing from the spirit of the invention.

What is claimed is:

1. In an airflow - calorimeter - wattmeter, a load unit comprising a resistor within a hydrogen-filled container and forming the center conductor of a coaxial line, and an outer conductor for said line having openings therein to enable flow of air past said resistor.

2. A device as claimed in claim 1, in which said outer conductor is a perforated tubular member.

3. A device as claimed in claim 1, in which said outer conductor comprises a plurality of spaced, parallel conducting elements.

4. In an apparatus of the character described, a coaxial line load unit having provision for forced air cooling of its central conductor.

PAUL J. OVREBO.